United States Patent
Bourcier et al.

(10) Patent No.: US 6,771,858 B2
(45) Date of Patent: Aug. 3, 2004

(54) TEMPERATURE-COMPENSATED OPTICAL WAVEGUIDE DEVICE

(75) Inventors: Roy J. Bourcier, Corning, NY (US); Susan C. Bourcier, Corning, NY (US); David M. Lineman, Painted Post, NY (US)

(73) Assignee: Corning, Inc., Corning, NY (US)

( * ) Notice: Subject to any disclaimer, the term of this patent is extended or adjusted under 35 U.S.C. 154(b) by 130 days.

(21) Appl. No.: 10/167,134

(22) Filed: Jun. 10, 2002

(65) Prior Publication Data

US 2003/0228102 A1 Dec. 11, 2003

(51) Int. Cl.[7] .................................................. G02B 6/34
(52) U.S. Cl. ............................ 385/37; 385/65; 385/88
(58) Field of Search ............................ 385/14, 37, 49, 385/65, 83, 88–94, 123

(56) References Cited

U.S. PATENT DOCUMENTS

2003/0068127 A1 * 4/2003 Franzen et al. ............... 385/37

* cited by examiner

*Primary Examiner*—Phan T. H. Palmer
(74) *Attorney, Agent, or Firm*—Svetlana Z. Short

(57) ABSTRACT

The present invention relates to a temperature-compensated optical waveguide device. The temperature-compensated optical waveguide device includes a substrate having a first end and a second end. A first mount is coupled to the first end of the substrate. The first mount includes a first surface, the first surface having a first grove and a first recess intersected by the first groove. A second mount is coupled to the second end of the substrate. The second mount includes a second surface having a second grove and a second recess intersected by the second groove. The first groove and the second groove are substantially aligned with one another; and an optical waveguide fiber coupled to the first mount and the second mount. The optical waveguide fiber has a Bragg grating. The substrate has a first coefficient of thermal expansion, the first mount has a second coefficient of thermal expansion and the second mount has a third coefficient of thermal expansion. The second and third coefficients of thermal expansion are greater than the first coefficient of thermal expansion.

24 Claims, 6 Drawing Sheets

TEMPERATURE-COMPENSATED OPTICAL WAVEGUIDE DEVICE

BACKGROUND OF THE INVENTION

1. Field of the Invention

The present invention relates generally to a temperature compensating optical waveguide device, and particularly to a temperature compensating optical waveguide device for fiber Bragg gratings.

2. Technical Background

Fiber Bragg gratings are widely used in optical communication systems. The center wavelength of a fiber Bragg grating changes with temperature and strain. A typical fiber Bragg grating experiences an upward shift of about 10 picometers per degree centigrade above its nominal operating temperature in the operational temperature regime generally specified for optical communication systems. Likewise, a typical fiber Bragg grating experiences a shift in center wavelength of about 0.1 picometer per psi of tensile stress.

Modern optical communication systems require that fiber Bragg gratings operate at or near a single center wavelength over a specified temperature range. A number of approaches have been proposed to athermalize fiber Bragg gratings. These approaches include mounting the fiber Bragg grating to a substrate having a negative coefficient of thermal expansion and bending the fiber. Both of these approaches have inherent difficulties that impair their operational performance. For example, negative expansion substrates typically require hermetic packaging to prevent degradation of operation characteristics due to environmental factors and systems that employ bending of the fiber to reduce tensile stress pose many manufacturing and long term stability challenges. Therefore, there is a need to develop an easily robust temperature compensating optical waveguide devices that is easy to manufacture and deploy.

SUMMARY OF THE INVENTION

One embodiment of the present invention is a temperature compensating optical waveguide device. The temperature compensating optical device includes a substrate. The substrate has a first end and a second end. The temperature compensating optical waveguide device also includes a first mount coupled to the first end and a second mount coupled to the second end. The temperature compensating optical waveguide device further includes an optical waveguide fiber coupled to the first mount and the second mount; wherein the optical waveguide fiber includes a Bragg grating.

In another aspect, the present invention includes a temperature compensating optical waveguide device. The temperature compensating optical waveguide device includes a substrate having a first coefficient of thermal expansion. The temperature compensating optical waveguide device further includes a first mount coupled to the substrate; the first mount having a second coefficient of thermal expansion. The temperature compensating optical waveguide device further includes a second mount coupled to the substrate; the second mount having a third coefficient of thermal expansion. The temperature compensating optical waveguide device also includes an optical waveguide fiber coupled to the first mount and the second mount; wherein the optical waveguide fiber includes a Bragg grating.

In another aspect, the present invention includes a temperature compensating optical waveguide device. The temperature compensating optical waveguide device includes a first member, the first member having an inner wall defining a cavity, wherein the first member has a first coefficient of thermal expansion. The temperature compensating optical waveguide device further includes a first mount coupled to the first member. At least a portion of the first mount is disposed within the cavity. The first mount has a second coefficient of thermal expansion different from the first coefficient of thermal expansion. The temperature compensating optical waveguide device further includes a second mount coupled to the first member. At least a portion of the second mount is disposed within the cavity. The second mount has a third coefficient of thermal expansion equal to the second coefficient of thermal expansion. The temperature compensating optical waveguide device further includes an optical waveguide fiber coupled to the first mount and the second mount, wherein the optical waveguide fiber has a Bragg grating.

In another aspect, the present invention includes a temperature-compensated optical waveguide fiber device. The temperature-compensated optical device includes a substrate having a first coefficient of thermal expansion. The substrate includes a first end and a second end. The temperature-compensated optical waveguide fiber device further includes a first fiber mount coupled to the first end of the substrate. The first fiber mount includes a first fiber-receiving groove and a first recess intersected by the first fiber receiving groove. The first fiber mount has a second coefficient of thermal expansion greater than said first coefficient of thermal expansion. The temperature-compensated optical waveguide fiber device further includes a second fiber mount coupled to the second end of the substrate. The said second fiber mount includes a second fiber-receiving groove and a second recess intersected by the second fiber-receiving groove. The second fiber mount has a third coefficient of thermal expansion greater than the first coefficient of thermal expansion. The first fiber-receiving groove and the second fiber-receiving groove are substantially aligned one to another. The temperature-compensated optical waveguide fiber device further includes an optical waveguide fiber device including a grating region, wherein the optical waveguide device is coupled to the first fiber mount and the second fiber mount, and the grating region is disposed between the first fiber mount and the second fiber mount. The grating region of the optical waveguide device has an operational center wavelength and the grating region is under tensile stress. The operational center wavelength varies less than +/−0.04 nanometers as said device is thermally cycled between about −10° C. and about 80° C.

In another aspect, the present invention includes a temperature-compensated optical fiber device. The temperature-compensated optical fiber device includes a cylindrical member having a groove extending longitudinally in the cylindrical member. The temperature-compensated optical fiber device further includes a first fiber mount coupled to the cylindrical member, wherein the first fiber mount is disposed in the groove. The temperature-compensated optical fiber device further includes a second fiber mount coupled to the cylindrical member, wherein the second fiber mount is disposed in the groove and is spaced apart from the first fiber mount. The temperature-compensated optical fiber device further includes an optical fiber device coupled to the first fiber mount and the second fiber mount, wherein the portion of the optical fiber device disposed between the first fiber mount and the second fiber mount is under tension. The cylindrical member, the first fiber mount and the second fiber mount each have a respective coefficient of thermal expansion. The respective coefficients of thermal expansion of the cylindrical member, the first fiber mount and the second fiber mount are selected so that the optical characteristics of said optical fiber device remain substantially unchanged from about −10° C. to about 80° C.

The temperature compensating optical waveguide device of the present invention results in a number of advantages over prior art temperature compensating optical waveguide devices. For example, the present invention does not require hermetic packaging.

Another advantage of the present invention is that it may be fabricated from readily available materials having well known properties.

Another advantage of the present invention over prior art temperature compensating optical waveguide devices is that thermal response characteristics of the may be adjusted after initial assembly of the temperature compensating optical waveguide device.

Another advantage of the present invention is that the lengths of the components used to assemble an embodiment of the present invention are not required to posses a high degree of accuracy.

Another advantage of the present invention is that the shift in center wavelength of the grating is minimized by tensioning the grating during assenbly.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
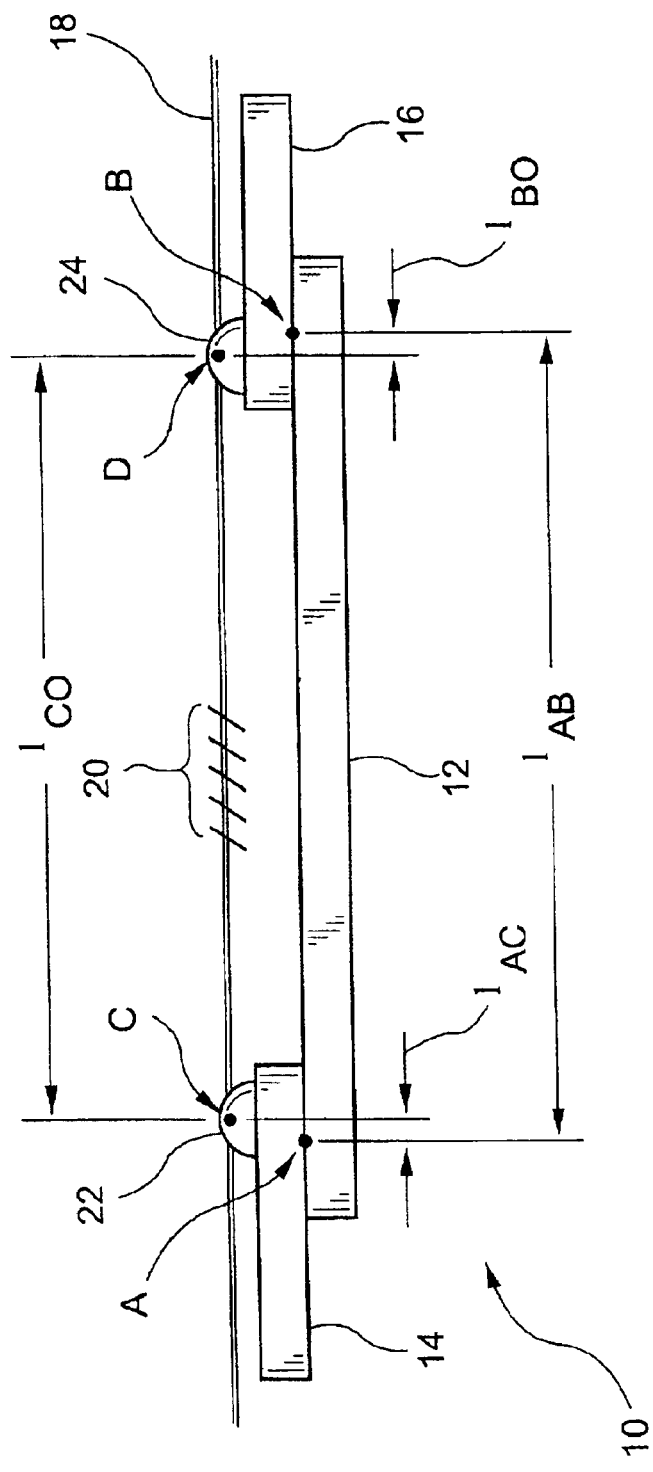
FIG. 1 is a side elevation view of a temperature-compensated optical device in which the present invention is embodied.

Reference will now be made in detail to the present preferred embodiments of the invention, examples of which are illustrated in the accompanying drawings. Wherever possible, the same reference numbers will be used throughout the drawings to refer to the same or like parts. An embodiment of the temperature-compensated optical device of the present invention is shown in FIG. 1, and is designated generally throughout by reference numeral 10.

In accordance with the invention, the present invention for a temperature-compensated optical device 10 includes a substrate 12. The substrate 12 is made from a material having a low coefficient of thermal expansion, such as, for example Invar® or Kovar®. The substrate 12 is an elongate body.

The present invention for a temperature-compensated optical device 10 also includes a first fiber mount 14 and a second fiber mount 16. The first and second fiber mounts 14, 16 are made from materials having a greater coefficients of thermal expansion than the substrate 12 such as, for example American Iron and Steel Institute (AISI) 304 stainless steel, which is also designated as S30400 under the Unified Number System.

The first fiber mount 14 and the second fiber mount 16 are coupled to the substrate 12 at two spaced apart locations A, B. The distance between the two spaced apart locations A, B will be referred to as $l_{AB}$. The first and second fiber mounts 14, 16 may be coupled to the substrate 12 by welding, such as, for example, by electron beam or laser welding.

The temperature-compensated optical device 10 also includes an optical fiber device 18. The optical fiber device 18 is coupled to the first and second fiber mounts 14, 16 at two spaced apart locations C, D. The distance along the optical fiber device 18 between the two spaced apart locations C, D will be referred to as lCD. Typically, the optical fiber device 18 includes a grating region 20. The optical fiber device 18 is coupled to the first and second fiber mounts 14, 16 so that the grating region 20 is disposed between the two spaced apart locations C, D. The optical fiber device 18 is coupled to the first and second fiber mounts 14, 16 using a creep resistant means, such as, for example, gold-tin solder or an epoxy. For example, in FIG. 1 the optical fiber device 18 is shown coupled to the first and second fiber mounts 14, 16 by two adhesive bodies 22, 24.

The change in the stress of the optical fiber device 18 as a function of temperature is given by equation 1. where $$\Delta\sigma_{fiber} = \frac{E_{fiber}\lfloor \alpha_1 l_{AB} - \alpha_2 l_{AC} - \alpha_3 l_{DB} - \alpha_f l_{CD} \rfloor}{l_{AB} - l_{AC} - l_{DB}} \quad (1)$$

$\Delta\sigma_{fiber}$=the change in stress in the optical fiber device 18 between the two spaced apart locations C, D;

$E_{fiber}$=Young's Modulus of Elasticity of the optical fiber device 18 between the two spaced apart locations C, D;

$\alpha_1$=the coefficient of thermal expansion of the substrate 12;

$\alpha_2$=the coefficient of thermal expansion of the first fiber mount 14;

$\alpha_3$=the coefficient of thermal expansion of the second fiber mount 16; and $\alpha_f$=the coefficient of thermal expansion of the optical fiber device 18.

Figure 2:
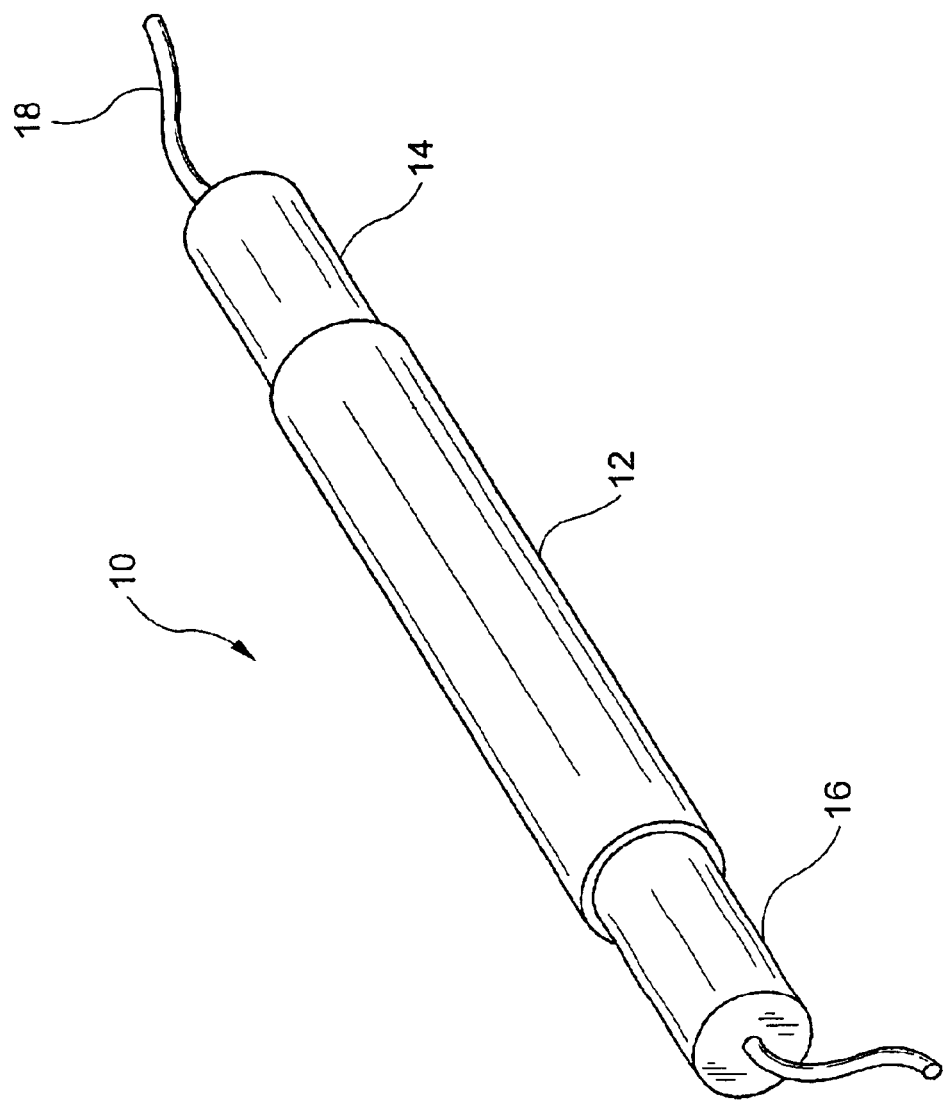
FIG. 2 is a perspective view of a temperature compensating optical waveguide device in which the present invention is embodied.
Figure 3:
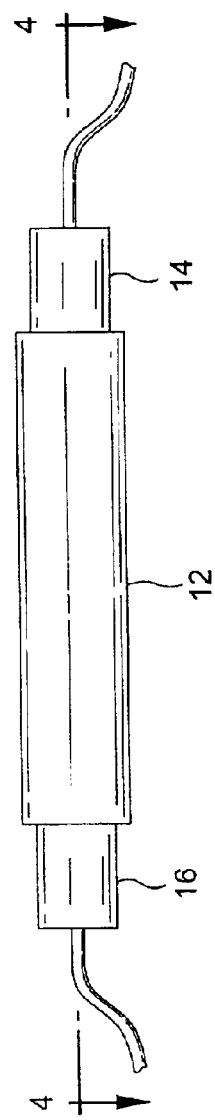
FIG. 3 is a top plan view of the temperature compensating optical waveguide device shown in FIG. 2.
Figure 4:
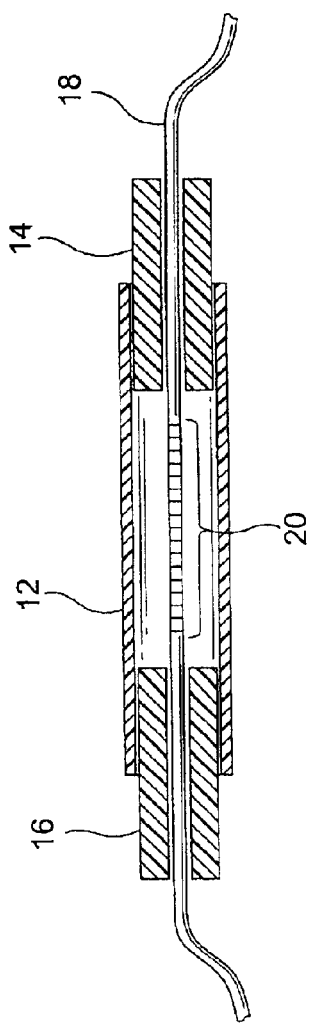
FIG. 4 is a coss-sectional view of the temperature compensating optical waveguide device of FIG. 2 taken through line 4—4 in FIG. 3.

In an alternate embodiment of the temperature-compensated optical device 10 of the present invention, as embodied herein and as shown in FIGS. 2, 3 and 4 the substrate 12 is a tubular member. The first and second fiber mounts 14, 16 are also tubular members. The outside diameters of the first and second fiber mounts 14, 16 are sized to allow insertion of the first and second fiber mounts 14, 16 into the inner diameter of the substrate 12. In a specific embodiment of the temperature-compensated optical device 10 shown in FIG. 2, the substrate 12 is an INVAR® tube having an inner diameter of about 0.012 inch to about 0.080 inch and an outer diameter of about 0.025 inch to about 0.125 inch. The substrate 12 has a length of about 2 inches to about 3.25 inches. The first and second fiber mounts 14, 16 are made of AISI 304 stainless steel and each has an outer diameter of from about 0.012 inch to about 0.078 inch and an inner diameter from about 0.004 inch to about 0.068 inch. The inner diameters of the first and second fiber mounts 14, 16 are sized to facilitate the coupling of the optical fiber device 18 to the first and second fiber mounts 14, 16. The first and second fiber mounts 14, 16 may have a length from about 0.4 inch to about 1.0 inch and from about 0.4 inch to about 1.0 inch respectively. The optical fiber device 18 is coupled to the inner surfaces of the first and second fiber mounts 14, 16 by solder or epoxy.

Figure 5:
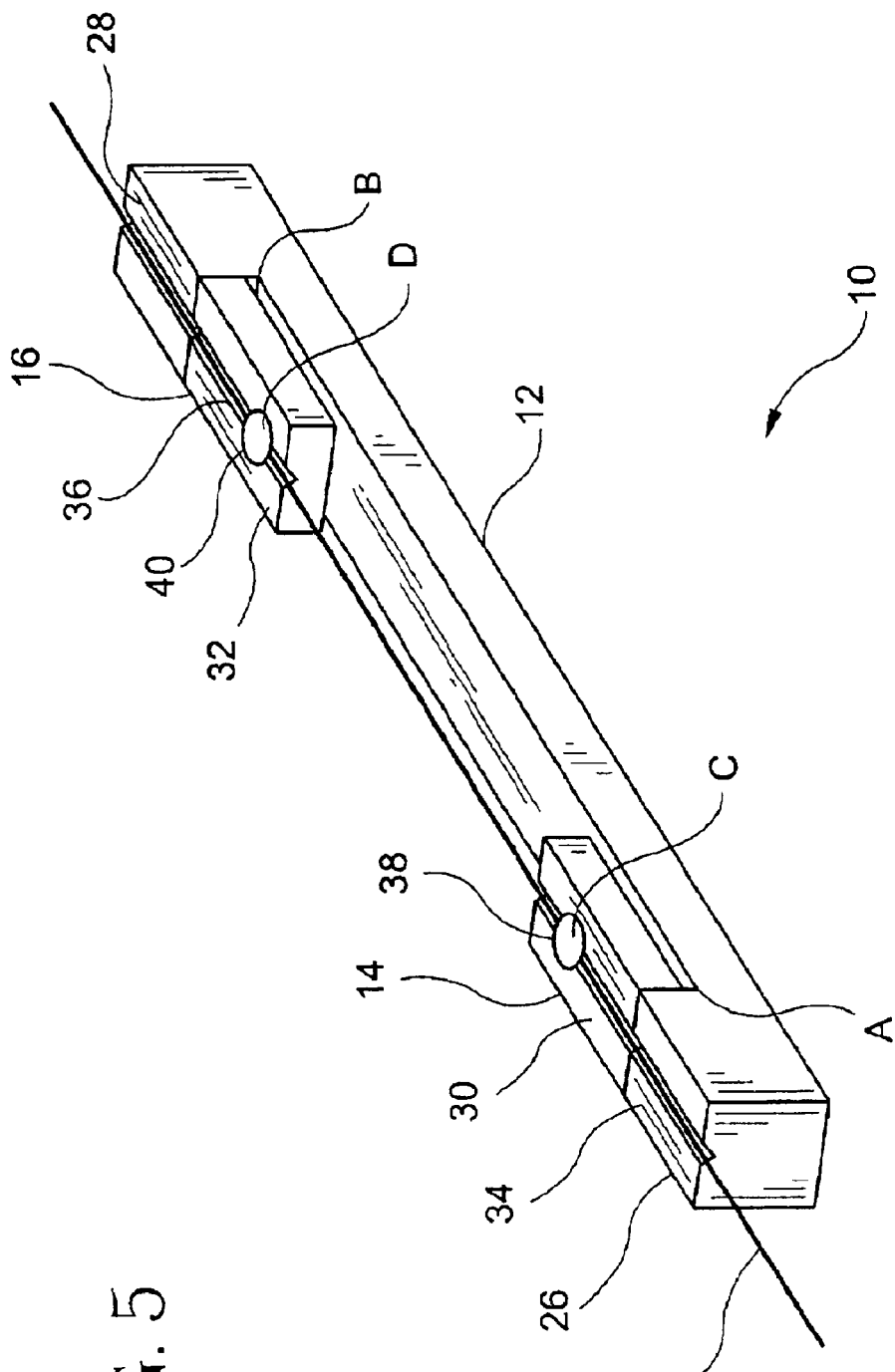
FIG. 5 is a perspective view of a temperature compensating optical waveguide device in which the present invention is embodied.

In another alternative embodiment of the invention, as embodied herein and as shown in FIG. 5, the temperature-compensated optical device 10 includes a substrate 12, a first fiber mount 14, a second fiber mount 16 and an optical fiber device 18.

The substrate 12 includes a first surface 26 and a second surface 28 the two surfaces 22, 24 lie in the same plane. The first fiber mount 14 includes a surface 30 and the second fiber mount includes a surface 32. The first and second fiber mounts 14, 16 are coupled to the substrate 12, such as, for example by welding, so that the surfaces 30, 32 of the first and second fiber mounts 14, 16 are coplanar with the first and second surfaces 26, 28 of the substrate 12. The first fiber mount 14 is positioned so that the surface 30 of the first fiber mount 14 is adjacent to the first surface 26 of the substrate 12. The second fiber mount 16 is positioned so that the surface 32 of the second fiber mount 16 is adjacent to the second surface 28 of the substrate 12.

The substrate 12 is made from a material having a lower coefficient of thermal expansion than those of the first and second fiber mounts 14, 16. Preferably, the substrate 12 is made from a low thermal expansion material, such as, for example, Invar®, Kovar®, Alloy 42® or a similar material. Preferably, the first and second fiber mounts 14, 16 are made from a high expansion material, such as, for example AISI 304 stainless steel.

It will be apparent to those of ordinary skill in the pertinent art that modifications and variations can be made in the selection of materials for the substrate 12 and the first and second fiber mounts 14, 16. Such modifications and variations in material selection are engineering choices to achieve the desired thermal response, in accordance with equation 1, of the temperature-compensated optical device 10.

The temperature-compensated optical device 10 further includes a first groove 34 and a second groove 36. The first and second grooves 34, 36 may be, for example V-grooves. The first and second grooves 34, 36 are sized to accommodate the optical fiber device 18. The first and second grooves 34, 36 are aligned with one another so that the optical fiber device 18 describes a straight line when placed in the grooves 34, 36.

The surfaces 30, 32 of the first and second fiber mounts 14, 16 also include a first recess 38 and a second recess 40 respectively. The first and second recesses 38, 40 are located along the first and second grooves 34, 36 respectively. The recesses 38, 40 may be, for example, circular depressions having a diameter of 0.063 inch and a depth of 0.034 inch.

The optical fiber device 18 is placed in the first and second grooves 34, 36 and tensioned so that the optical waveguide device 18 has predetermined optical characteristics, such as, for example a certain center wavelength when the optical waveguide fiber device includes a grating.

The optical fiber device 18 is coupled to the first and second fiber mounts 14, 16 using an adhesive, such as for example Chipshield 2400, available from Electronic Materials of Brackenridge, Colo. The adhesive is applied to the optical waveguide fiber device 18 in the regions adjacent to the first and second recesses 38, 40. The adhesive, when cured, should fully engage each of the recesses first and second fiber mounts 14, 16 as well coupling to the optical waveguide fiber device 18.

In a specific example of the temperature-compensated optical device 10 as depicted in FIG. 5 the length of the substrate 12 between points A and B is 3.00 inches and the substrate 12 is made from Invar®. The distances from the centers C, D of the first and second recesses 38, 40 to the Points A and B are 0.550 inch respectively. The first and second fiber mounts 14, 16 are both made from AISI 304 stainless steel. The substrate 12 and the first and second fiber mounts 14, 16 are 0.100 inch wide. Over the temperature range of interest, from about −10° C. to about 80° C., Invar® has a coefficient of thermal expansion of about $1.3 \times 10^{-6}$ per ° C. and AISI 304 stainless steel has a coefficient of thermal expansion of about $1.73 \times 10^{-1}$ per ° C. Substituting these values into equation 1 yields a temperature-compensated optical device that strains the optical waveguide device 18 $-8.5 \times 10^{-6}$ inch per ° C. variation from the temperature.

Figure 6:
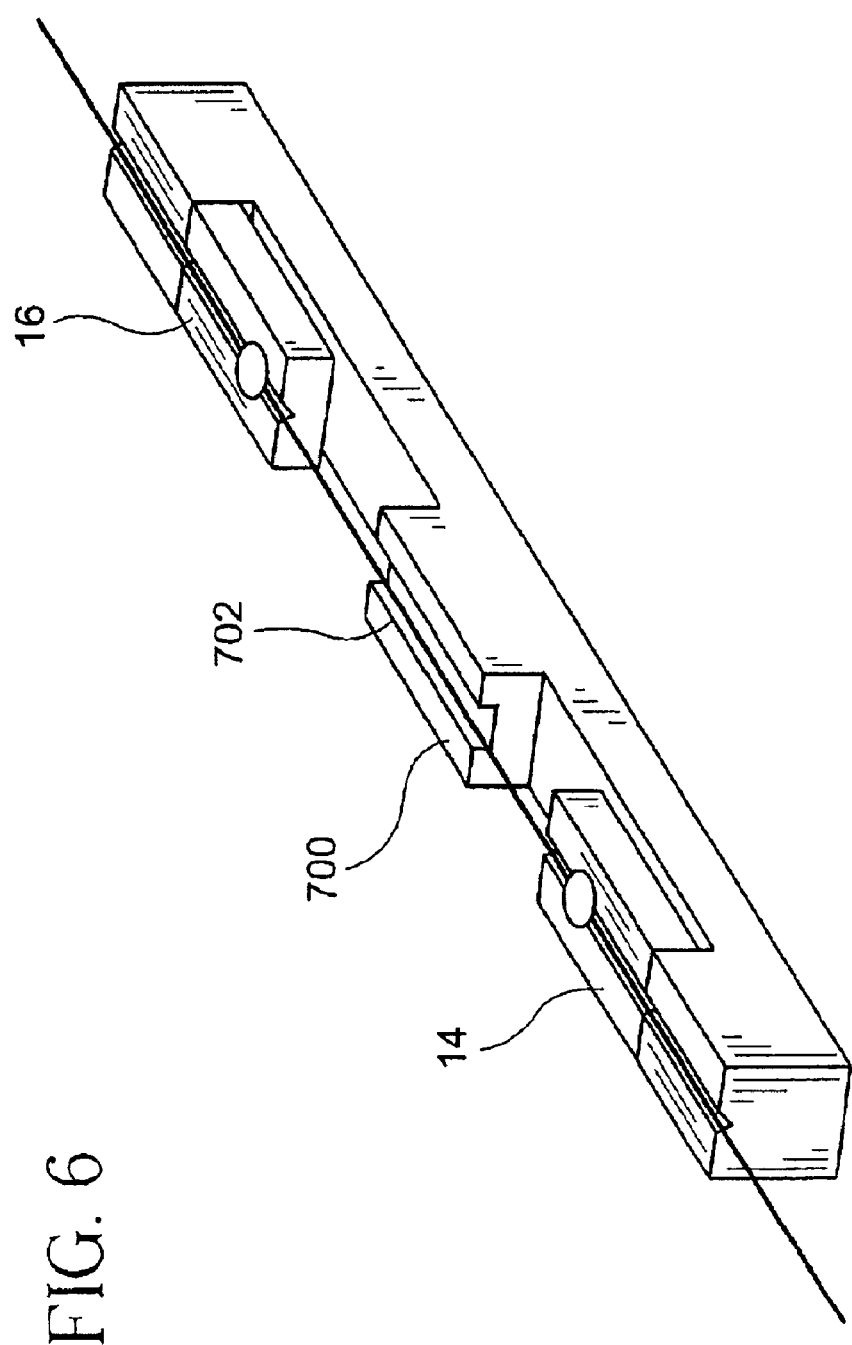
FIG. 6 is a perspective view of a temperature compensating optical waveguide device in which the present invention is embodied.

An alternative embodiment 42 of the temperature-compensated optical device of the present invention, as embodied herein and depicted in FIG. 6 is similar to the temperature-compensated optical device 10. The temperature-compensated optical device 42 illustrated in FIG. 6 differs from the temperature-compensated optical device 10 illustrated in FIG. 5 in that the substrate 12 includes a raised portion 44. The raised portion 44 includes a groove 46. The groove 46 is sized to allow the optical fiber device 18 to pass over the raised portion 44 without contacting the substrate 12. The groove 46 may be, for example, 0.034 inch wide by 0.040 inch deep. The raised portion 44 stiffens the substrate 12 to minimize bending of the substrate 12 and hence the optical waveguide device 18, thus improving the temperature compensating characteristics of the temperature-compensated optical device 42.

Figure 7:
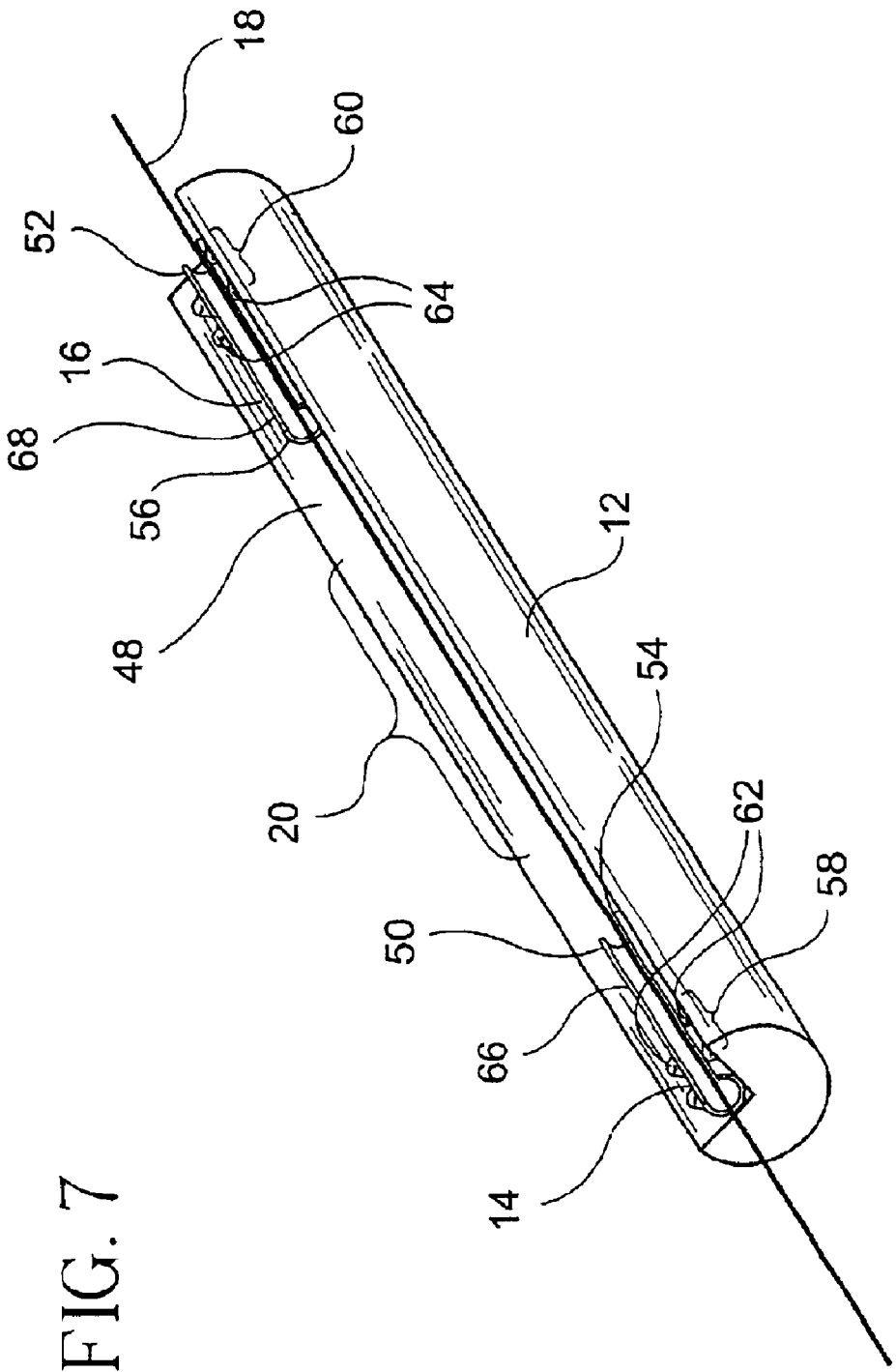
FIG. 7 is a perspective view of a temperature compensating optical waveguide device in which the present invention is embodied.

In another alternative embodiment of the invention, as embodied herein and as shown in FIG. 7, the substrate 12 is a cylindrical member having a longitudinal groove 48. The longitudinal groove 48 extends the length of the substrate 12. The longitudinal groove 48 may be, as shown, a V-groove. The longitudinal groove 48 allows the first and second fiber mounts 14, 16 to be easily located with respect to one another.

The substrate 12 is made from a material having a low coefficient of thermal expansion, such as, for example Kovar® or Invar®.

The first and second fiber mounts 14, 16 are tubular, preferably cylindrical tubes. Both the first and second fiber mounts 14, 16 include a longitudinal opening 50, 52. The longitudinal openings 50, 52 are preferably parallel to the longitudinal axis of their respective fiber mounts 14, 16.

The first and second fiber mounts 14, 16 are coupled to the substrate 12 at two spaced apart locations. The distance between the interior ends 54, 56 is greater than the length of the grating region 20. The first and second fiber mounts 14, 16 may be coupled to the substrate 12 such as, for example by welding. Preferably, the first and second fiber mounts 14, 16 are coupled to the substrate 12 by a series of spaced apart welds 60, 62 such as, for example a series of welds formed using a laser. If the first and second fiber mounts 14, 16 are coupled to the substrate 12 using a series of spaced apart welds, the effective attachment point of the first and second fiber mounts 14, 16 to the substrate 12 are the interior most welds of the respective series of welds.

The first and second fiber mounts 14, 16 are oriented within the longitudinal groove 48 such that the longitudinal openings 60, 52 are substantially aligned with one another. The longitudinal openings 50, 52 are sized to allow an optical waveguide fiber 18 to be inserted into the first and second fiber mounts 14, 16 without damaging the optical waveguide fiber 18.

The first and second fiber mounts 14, 16 are made from materials having greater positive coefficients of thermal expansion than the substrate 12, such as, for example AISI 304 stainless steel.

The optical waveguide fiber 18 is coupled to the first and second fiber mounts 14, 16. The grating region 20 is tensioned to a predetermined amount before the optical waveguide fiber 18 is coupled to the first and second fiber mounts 14, 16. The optical waveguide fiber 18 may be coupled to the first and second fiber mounts 14, 16 in a number of ways, examples of which are adhesive bonding and soldering. In the case where the optical waveguide fiber 18 is soldered to the first and second fiber mounts 602, 604 the optical waveguide fiber 18 must first be metallized in the regions to be soldered to the first and second fiber mounts 14, 16. Such metallization is well known to those skilled in the art of packaging optical devices. The specifics of the optical fiber metallization depend upon the solder to be used, the composition of the optical waveguide fiber and the environmental conditions the solder connection will be subject to.

The change in the stress of the grating region 20 as a function of temperature is given by equation 1. The change in stress as a function of the temperature is dependent upon the distance between where the first and second fiber mounts 14, 16 are coupled to the substrate 12 and the lengths of the portions 66, 68 of the first and second fiber mounts 14, 16 interior to the coupling of the first and second fiber mounts 14, 16 to the substrate 12.

As described above, numerous materials may be used in the construction of the present invention. Some advantageous combinations of materials and lengths are detailed in Table 1 below. Table 1 contains values of overall coefficient of thermal expansion for devices made according to the present invention. As used in Table 1, Component 1 refers to the substrate and Components 2 and 3 refer to the first and second fiber mounts of the present invention. Overall CTE as used in Table 1 refers to the overall CTE of the temperature-compensated optical device of the present invention between the fiber attachment points C and D.

TABLE 1

Some Examples of negative overall CTE obtained in the FIG. 1 structure

| | Component 1 | | | Component 2 | | | Component 3 | |
|---|---|---|---|---|---|---|---|---|
| Material | CTE (per °C.) | Length (inches) | Material | CTE (per °C.) | Length (inches) | Material | CTE (per °C.) | Length (inches) |
| Invar® | $1.34 \times 10^{-6}$ | 3.00 | 304 SS | $1.73 \times 10^{-5}$ | 0.55 | 304 SS | $1.73 \times 10^{-5}$ | 0.55 |
| Invar® | $1.34 \times 10^{-6}$ | 3.00 | Ni 200 | $1.33 \times 10^{-5}$ | 0.60 | Ni 200 | $1.33 \times 10^{-5}$ | 0.60 |
| Alloy 42® | $5.40 \times 10^{-6}$ | 3.00 | 304 SS | $1.73 \times 10^{-5}$ | 0.75 | 304 SS | $1.73 \times 10^{-5}$ | 0.75 |
| Invar® | $1.34 \times 10^{-6}$ | 2.00 | 304 SS | $1.73 \times 10^{-5}$ | 0.25 | 304 SS | $1.73 \times 10^{-5}$ | 0.50 |
| Kovar® | $1.10 \times 10^{-6}$ | 2.25 | Ni 200 | $1.33 \times 10^{-5}$ | 0.50 | Ni 200 | $1.33 \times 10^{-5}$ | 0.50 |
| Kovar® | $1.10 \times 10^{-6}$ | 2.25 | Ni 200 | $1.33 \times 10^{-5}$ | 0.34 | Ni 200 | $1.33 \times 10^{-5}$ | 0.50 |

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A temperature compensating optical waveguide device comprising:
   a substrate, said substrate having:
      a first end; and
      a second end;
   a first mount coupled to said first end, said first mount including:
      a first surface, said first surface having a first groove; and
      a first recess intersected by said first groove;
   a second mount coupled to said second end, said second mount including:
      a second surface, said second surface having a second groove; and
      a second recess intersected by said second groove;
   wherein, said first groove and said second groove are substantially aligned with one another; and
   an optical waveguide fiber coupled to said first mount and said second mount;
   wherein said optical waveguide fiber has a Bragg grating;
   wherein said substrate has a first coefficient of thermal expansion;
   wherein said first mount has a second coefficient of thermal expansion;
   wherein said second mount has a third coefficient of thermal expansion;
   wherein said second coefficient of thermal expansion is greater than said first coefficient of thermal expansion;
   wherein said third coefficient of thermal expansion is greater than said first coefficient of thermal expansion.

2. The temperature compensating optical waveguide device of claim 1 wherein:

said second coefficient of thermal expansion is equal to said third coefficient of thermal expansion.

3. The temperature compensating optical waveguide device of claim 1:
   wherein said first recess is substantially circular; and
   wherein said second recess is substantially circular.

4. The temperature compensating optical waveguide device of claim 3 further including:
   a first adhesive body disposed to couple said optical waveguide fiber to said first mount;
   a second adhesive body disposed to couple said optical waveguide fiber to said second mount;
   wherein at least a portion of said first adhesive body is disposed within said first recess; and
   wherein at least a portion of said second adhesive body is disposed within said second recess.

5. A temperature compensating device for an optical waveguide device, said temperature compensating device comprising:
   a substrate, said substrate including a first end and a second end spaced apart from one another, wherein said substrate has a first coefficient of thermal expansion;
   a first fiber mount welded to said first end, wherein said first fiber mount has a second coefficient of thermal expansion; and
   a second fiber mount welded to said second end, wherein said second fiber mount has a third coefficient of thermal expansion;
   wherein the optical waveguide device is coupled to said first fiber mount;
   wherein the optical waveguide is coupled to said second fiber mount;
   wherein said second coefficient of thermal expansion is greater than said first coefficient of thermal expansion;
   wherein said third coefficient of thermal expansion is greater than said first coefficient of thermal expansion;
   wherein said first fiber mount is coupled to the substrate by at least one spot weld;
   wherein said second fiber mount is coupled to said substrate by at least one spot weld;
   wherein the temperature compensating characteristics of said temperature compensating device may be altered by adding further spot welds.

6. The temperature compensating optical waveguide device of claim 5,
   wherein said first mount is welded to said substrate; and
   wherein said second mount is welded to said substrate.

7. The temperature compensating optical waveguide device of claim 6, wherein said optical waveguide fiber is adhesively bonded to said first mount and said second mount.

8. The temperature compensating optical waveguide device of claim 6, said optical waveguide fiber including two metallized portions disposed about said Bragg grating, wherein said two metallized portions are soldered to said first mount and said second mount.

9. The temperature compensating optical waveguide device of claim 6 wherein said optical waveguide fiber is coupled to said first mount and said second mount by glass frits.

10. The temperature compensating optical waveguide device of claim 5,
    wherein said first mount is adhesively bonded to said substrate; and
    wherein said second mount is adhesively bonded to said substrate.

11. A temperature-compensated optical waveguide fiber device comprising:
    a substrate, said substrate having a first coefficient of thermal expansion, wherein said substrate includes:
    a first end; and
    a second end;
    a first fiber mount coupled to said first end, said first fiber mount having:
    a first fiber-receiving groove; and
    a first recess intersected by said first fiber-receiving groove;
    wherein said first fiber mount has a second coefficient of thermal expansion greater than said first coefficient of thermal expansion;
    a second fiber mount coupled to said second end, said second fiber mount having:
    a second fiber-receiving groove; and
    a second recess intersected by said second fiber-receiving groove;
    wherein said second fiber mount has a third coefficient of thermal expansion greater than said first coefficient of thermal expansion;
    wherein said first fiber-receiving groove and said second fiber-receiving groove are substantially aligned one to another; and
    an optical waveguide fiber device including a grating region, wherein said optical waveguide device is coupled to said first fiber mount and said second fiber mount;
    wherein said grating region is disposed between said first fiber mount and said second fiber mount;
    wherein said grating region has an operational center wavelength;
    wherein said grating region is under tensile stress; and
    wherein said operational center wavelength varies less than +/−0.04 nanometers as said device is thermally cycled between about −10° C. and about 80° C.

12. The device of claim 11 wherein said first recess is circular and said second recess is circular.

13. The device of claim 12 wherein said first recess has a diameter of about 0.063 inch and a depth of 0.034 inch; and wherein said second recess has a diameter of about 0.063 inch and a depth of 0.034 inch.

14. The device of claim 13, wherein said substrate further includes a central fiber receiving groove disposed between said first end and said second end, wherein said central fiber receiving groove is substantially aligned with said first fiber receiving groove and said second fiber receiving groove.

15. The device of claim 11 wherein said second coefficient of thermal expansion is equal to said third coefficient of thermal expansion.

16. A temperature-compensated optical fiber device comprising:
    a cylindrical member having a groove extending longitudinally in said cylindrical member;
    a first fiber mount coupled to said cylindrical member, wherein said first fiber mount is disposed in said groove;
    a second fiber mount coupled to said cylindrical member, wherein said second fiber mount is disposed in said groove and is spaced apart from said first fiber mount; and
    an optical fiber device coupled to said first fiber mount and said second fiber mount, wherein the portion of the optical fiber device disposed between said first fiber mount and said second fiber mount is under tension;

wherein said cylindrical member, said first fiber mount and said second fiber mount each has a respective coefficient of thermal expansion;

wherein the respective coefficients of thermal expansion of said cylindrical member, said first fiber mount and said second fiber mount are selected so that the optical characteristics of said optical fiber device remain substantially unchanged from about −10° C. to about 80° C.

17. The temperature-compensated optical device of claim 16, wherein:

said first fiber mount includes a first tubular member; and said second fiber mount includes a second tubular member.

18. The temperature-compensated optical device of claim 17 wherein:

said first tubular member includes a first longitudinal opening;

said second tubular member includes a second longitudinal opening; and said optical fiber device includes:
 a first metallized region; and
 a second metallized region spaced apart from said first metallized region, wherein said first and second metallized regions are coupled to said first and second tubular members respectively.

19. The temperature-compensated optical device of claim 18 wherein said first tubular member is made of metal and welded to said cylindrical member; and wherein said second tubular member is made of metal and welded to said cylindrical member.

20. The temperature-compensated optical device of claim 19 wherein said first tubular member is spot welded to said cylindrical member; and wherein said second tubular member is spot welded to said cylindrical member.

21. The temperature-compensated optical device of claim 20 wherein the thermal response characteristics of said temperature-compensated optical device may be adjusted by after assembly by selectively increasing the number of spot welds coupling said first and second fiber mounts to said cylindrical member.

22. The temperature-compensated optical device of claim wherein said first metallized region is soldered to said first tubular member and said second metallized region is soldered to said second tubular member.

23. The temperature-compensated optical device of claim 16 wherein the coefficient of thermal expansion of said cylindrical member is less than the coefficient of thermal expansion of said first fiber mount and the coefficient of said second fiber mount.

24. The temperature-compensated optical device of claim 23 wherein the coefficient of thermal expansion of said first fiber mount is substantially equal to the coefficient of thermal expansion of said second fiber mount.

* * * * *